US006955859B2

(12) United States Patent
Kimura et al.

(10) Patent No.: US 6,955,859 B2
(45) Date of Patent: Oct. 18, 2005

(54) BATTERY PACK SYSTEM

(75) Inventors: Tadao Kimura, Kobe (JP); Toshiaki Nakanishi, Toyohashi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 537 days.

(21) Appl. No.: 10/153,467

(22) Filed: May 22, 2002

(65) Prior Publication Data

US 2002/0177034 A1 Nov. 28, 2002

(30) Foreign Application Priority Data

May 28, 2001 (JP) ....................................... 2001-158614

(51) Int. Cl.[7] ............................................... H01M 10/44

(52) U.S. Cl. ............................. 429/7; 429/50; 429/121; 429/122

(58) Field of Search ............................ 429/3, 7, 50, 90, 429/121, 122, 125, 151, 153, 161, 162; 320/125, 151, 153, 161, 162

(56) References Cited

U.S. PATENT DOCUMENTS 4,686,443 A 8/1987 Steblay
5,349,282 A * 9/1994 McClure ..................... 320/136
5,563,496 A 10/1996 McClure
5,633,573 A 5/1997 van Phuoc et al.
5,686,815 A 11/1997 Reipur et al.
5,738,919 A * 4/1998 Thomas et al. ................ 429/3
5,786,682 A 7/1998 Aiken et al.
6,100,669 A 8/2000 Tokita
6,313,605 B1 * 11/2001 Tsenter ....................... 320/125

FOREIGN PATENT DOCUMENTS

JP 9-285018 10/1997

* cited by examiner

*Primary Examiner*—Michael Barr
*Assistant Examiner*—Monique Wills
(74) *Attorney, Agent, or Firm*—Hamre, Schumann, Mueller & Larson, P.C.

(57) ABSTRACT

A battery pack system is provided that can be replaced easily without modifying the side of an appliance using this battery pack system, on which charging is controlled by a voltage control, and includes a secondary battery with high performance that undergoes charging by a current control. A battery pack system is provided with a battery including at least one unit cell serving as a secondary battery with a positive electrode containing a nickel oxide as an active material, a detecting portion for detecting a battery state including a charging state in the battery, and a current adjusting portion, that is connected in series with the battery, for adjusting a charging current value according to the charging state detected by the detecting portion.

7 Claims, 2 Drawing Sheets

BATTERY PACK SYSTEM

BACKGROUND OF THE INVENTION

1. Field of the Invention

The present invention relates to a battery pack system for a secondary battery with a positive electrode containing a nickel oxide as an active material, such as a nickel-metal hydride (Ni-MH) secondary battery. In particular, the present invention relates to a battery pack system applicable to appliances that are charged by a voltage control as in a lead storage battery or the like.

2. Description of Related Art

The following is a description of a conventional battery pack system, with reference to FIG. 4.

FIG. 4 shows a schematic configuration of a conventional battery pack system. In FIG. 4, a conventional battery pack system 40 includes a positive electrode terminal 41 and a negative electrode terminal 42, which are input/output terminals to be connected to the side of an appliance using this system, a battery 43 including at least one unit cell serving as a secondary battery, a detecting portion 44 for detecting a battery state BS (for example, voltage, current, temperature or a charging state) of the battery 43, and a controlling terminal 45, connected to the appliance side, to which information BI regarding the battery state is outputted from the detecting portion 44.

In this battery pack system 40, information BI regarding the battery state usually is transmitted from the detecting portion 44 via the controlling terminal 45 to the side of an appliance using this battery pack system 40. The appliance using this system is configured to control charging/discharging of the battery pack system 40 based on the received information BI regarding the battery state (for example, charging state information).

In order to achieve higher performance and lighter weight of an appliance using this battery pack system 40, it is desirable for a user that this battery pack system 40 can be replaced easily with that including a light-weight, high output-performance and long-life secondary battery without any modification in the configuration of a charging device on the appliance side.

For example, JP 9(1997)-285018 A discloses a battery pack system including a lithium-ion secondary battery that is charged by a voltage control. This battery pack system is compatible with a battery pack including a nickel-cadmium secondary battery, which is charged by a current control, also at the time of charging and has a higher energy density than the nickel-cadmium secondary battery (in other words, can accumulate energy more densely).

When using this battery pack system, there is an advantage in that the battery pack can be replaced without modifying the configuration of a charging device on the side of the appliance using the battery pack including the nickel-cadmium secondary battery.

However, in some cases the appliance using the battery pack system is configured to control charging by the voltage control, whose configuration is simpler than that of the current control, for the purpose of using lead storage batteries and lithium-ion secondary batteries. When attempting to mount a battery pack system including a nickel-metal hydride secondary battery with high performance that has both a high energy density and a high output density on such an appliance, since the appliance side has to control charging based on the information regarding the battery state transmitted from the detecting portion, an extensive modification of the charging device becomes necessary, leading to a cost increase.

SUMMARY OF THE INVENTION

In view of the problem described above, it is an object of the present invention to provide a battery pack system that can be replaced easily without modifying a conventional way of controlling charging by a voltage control, in other words, without modifying the side of an appliance using this battery pack system, and includes a high-performance secondary battery that undergoes charging by a current control.

In order to achieve the above-mentioned object, a battery pack system according to the present invention includes a battery including at least one unit cell serving as a secondary battery with a positive electrode containing a nickel oxide as an active material, a detecting portion for detecting a battery state including a charging state in the battery, and a current adjusting portion that is connected in series with the battery, for adjusting a charging current value according to the charging state detected by the detecting portion.

In this battery pack system, it is preferable that the current adjusting portion includes a variable resistor for changing a resistance according to the charging state detected by the detecting portion.

In this case, it is preferable that the variable resistor includes a plurality of switching elements, and a plurality of resistance elements, respectively corresponding to the plurality of switching elements. The plurality of switching elements are opened and closed selectively according to the charging state detected by the detecting portion.

Furthermore, it is preferable that the variable resistor increases the resistance according to the charging state detected by the detecting portion at the time of continuously charging the battery and decreases the resistance at the time of actually using the battery.

It is preferable that the battery pack system according to the present invention includes a first rectifying element that is connected in series with the current adjusting portion and conducts only a current in a charging direction of the battery, and a second rectifying element that is connected in parallel with the current adjusting portion and the first rectifying element and conducts only a current in a discharging direction of the battery.

Also, in the battery pack system according to the present invention, it is preferable that the detecting portion detects the charging state based on a terminal voltage, a charging/discharging current and a temperature of the battery.

Moreover, in the battery pack system according to the present invention, it is preferable that a nickel-metal hydride secondary battery is used.

With the above configuration, when attempting to mount a battery pack system including a nickel-metal hydride secondary battery with high performance or the like to an appliance controlling charging by a voltage control, whose configuration is simpler than that of a current control, for the purpose of using a lead storage battery or the like, the detecting portion adjusts the resistance of the variable resistor in the current adjusting portion according to the charging state of the secondary battery. Thus, the battery pack system can adjust a charging amount of the secondary battery for itself.

This eliminates the need for a modification for controlling charging by the current control on the side of the appliance, thus allowing the replacement with the battery pack system including a nickel-metal hydride secondary battery with high performance or the like while maintaining the conventional way of controlling charging by the voltage control.

In addition, by providing the current adjusting portion only in a path through which a charging current flows, it also is possible to apply the battery pack system according to the present invention as a driving source to hybrid vehicles in which charging and discharging are switched within a short period of time.

DESCRIPTION OF THE PREFERRED EMBODIMENTS

The following is a description of preferred embodiments of the present invention, with reference to the accompanying drawings.

First Embodiment

Figure 1:
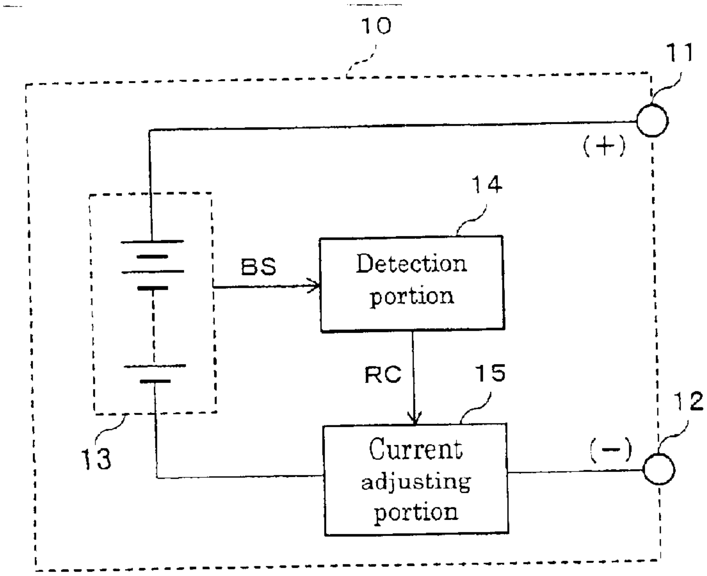
FIG. 1 shows a schematic configuration of a battery pack system according to a first embodiment of the present invention.

FIG. 1 shows a schematic configuration of a battery pack system according to a first embodiment of the present invention.

In FIG. 1, a battery pack system 10 includes a positive electrode terminal 11 and a negative electrode terminal 12, which are input/output terminals to be connected to the side of an appliance using this system, a battery 13 including at least one unit cell formed of, for example, a nickel-metal hydride secondary battery, a detecting portion 14 for detecting a battery state BS (for example, voltage, current or temperature) of the battery 13 and a charging state, and a current adjusting portion 15 for changing and setting a resistance of a variable resistor by a resistance control signal RC corresponding to the charging state detected by the detecting portion 14 and adjusting a charging current.

Figure 2:
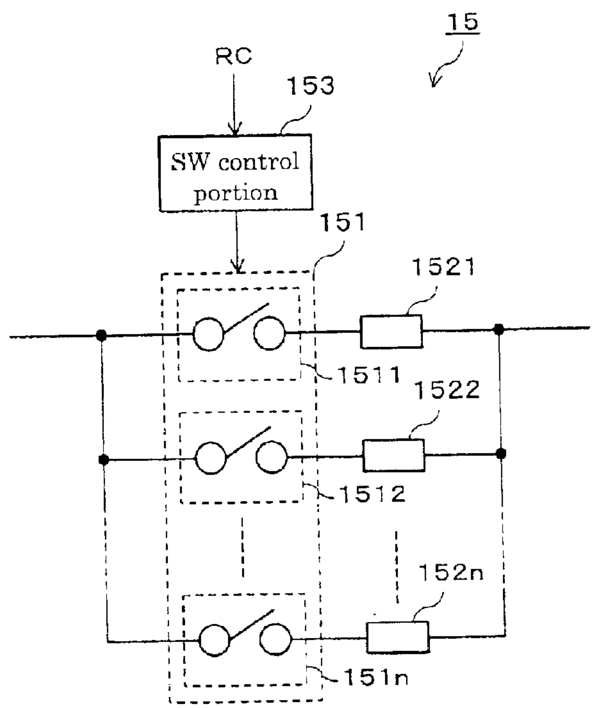
FIG. 2 is a block diagram showing a configuration of a current adjusting portion 15 in FIG. 1.

FIG. 2 is a block diagram showing an exemplary configuration of the variable resistor constituting the current adjusting portion 15. In FIG. 2, numeral 151 denotes a switching element group including n switching elements 1511, 1512, . . . , 151*n*. The first ends of these switching elements are connected in common.

Numerals 1521, 1522, . . . , 152*n* denote n resistance elements. The first ends of the resistance elements are connected to the second ends of the corresponding switching elements 1511, 1512, . . . , 151*n*, while the second ends of the resistance elements are connected in common. The resistance elements 1521, 1522, . . . , 152*n* have different resistances.

Numeral 153 denotes a switching (SW) control portion for receiving the resistance control signal RC from the detecting portion 14 in FIG. 1 and selectively opening and closing each of the switching elements 1511, 1512, . . . 151*n* of the switching element group 151.

Next, the operation of the current adjusting portion 15 configured as above will be described.

First, at the time of a continuous charging from the appliance to the battery 13, the switching control portion 153 selectively opens and closes each of the switching elements 1511, 1512, . . . , 151*n* according to the resistance control signal RC from the detecting portion 14, thus increasing a combined resistance of the resistance elements as a whole. This makes it possible to control charging by the current control not on the side of the appliance but on the side of the battery pack system 10.

On the other hand, when the detecting portion 14 detects that the battery 13 becomes fully charged, it instructs, by the resistance control signal RC, the switching control portion 153 of the current adjusting portion 15 to close all the switching elements 1511, 1512, . . . , 151*n* so as to minimize the combined resistance of the resistance elements as a whole for an actual use of the battery 13 by the appliance using this system.

Second Embodiment

A battery pack system that is applicable to equipment in which charging and discharging are switched within a short period of time, such as hybrid vehicles, will be discussed as a second embodiment.

Figure 3:
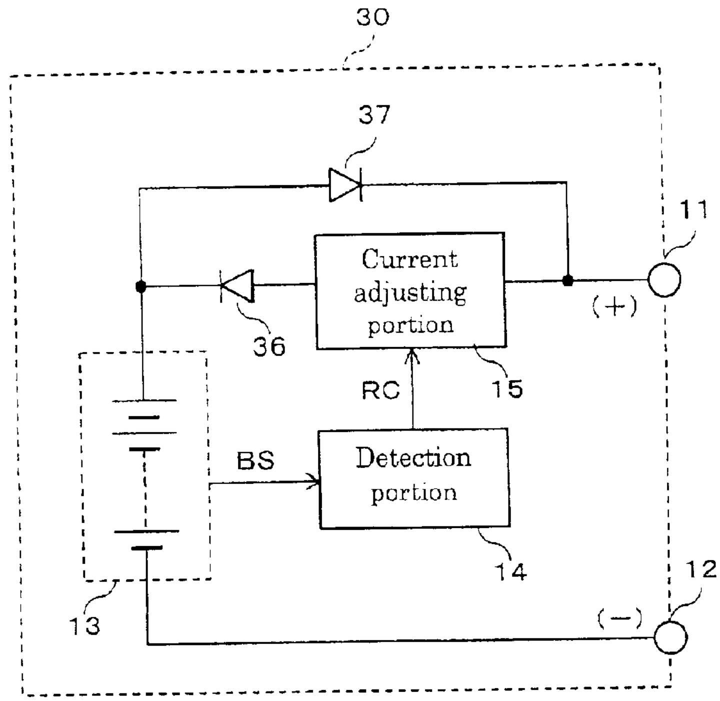
FIG. 3 shows a schematic configuration of a battery pack system according to a second embodiment of the present invention.
Figure 4:
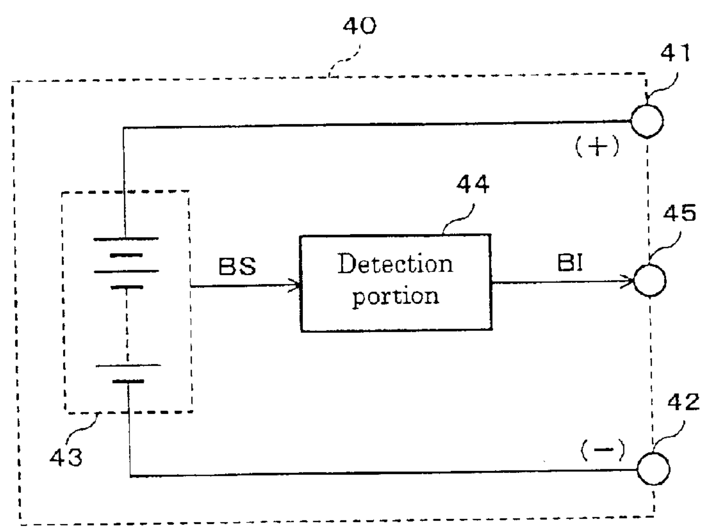
FIG. 4 shows a schematic configuration of a conventional battery pack system.

FIG. 3 shows a schematic configuration of a battery pack system according to a second embodiment of the present invention. In FIG. 3, elements similar to those in FIG. 1 are given the same numerals, and the description thereof will be omitted here.

The second embodiment is different from the first embodiment in that, as shown in FIG. 3, there are provided a first diode 36 (a first rectifying element) that is connected in series with the current adjusting portion 15 and conducts only a current in a charging direction and a second diode 37 (a second rectifying element) that is connected in parallel with the first diode 36 and the current adjusting portion 15 and conducts only a current in a discharging direction.

This allows the current adjusting portion 15 to function only when charging the battery 13. Accordingly, it is possible to secure a sufficient battery output performance by the discharge of the battery 13 also with respect to equipment in which charging and discharging are switched within a short period of time.

Incidentally, although pairs of the switching element and the resistance element connected in series are connected in parallel so as to constitute the variable resistor in the present embodiment, the present invention is not limited to this but also may have the following configuration. That is, pairs of the switching element and the resistance element connected in parallel are connected in series so as to constitute the variable resistor. Moreover, other configurations may be adopted as long as the similar function can be achieved.

As described above, in accordance with the present invention, even when attempting to mount a battery pack system including a nickel-metal hydride secondary battery with high performance or the like on an appliance controlling charging by a voltage control whose configuration is simpler than that of a current control, the battery pack system adjusts a charging amount of the secondary battery for itself. This eliminates the need for a modification for controlling charging by the current control on the side of the appliance, thus producing the special effect of allowing the replacement with the battery pack system including a nickel-metal hydride secondary battery with high performance or the like while maintaining the conventional way of controlling charging by the voltage control.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A battery pack device comprising:

terminals to be connected to a side of an appliance;

a battery comprising at least one unit cell serving as a secondary battery with a positive electrode containing a nickel oxide as an active material;

a detecting portion for detecting a battery state including a charging state in the battery and outputting a control signal according to the detected charging state; and a current adjusting portion, that is connected in series with the battery, for adjusting a charging current value according to the control signal supplied by the detecting portion;

wherein the detecting portion and the current adjusting portion are part of the device when the terminals are connected to an appliance.

2. The battery pack device according to claim 1, wherein the current adjusting portion comprises a variable resistor for changing a resistance according to the charging state detected by the detecting portion.

3. The battery pack device according to claim 2, wherein the variable resistor comprises:

a plurality of switching elements, and a plurality of resistance elements, respectively corresponding to the plurality of switching elements, wherein the plurality of switching elements are opened and closed selectively according to the charging state detected by the detecting portion.

4. The battery pack device according to claim 2, wherein the variable resistor increases the resistance according to the charging state detected by the detecting portion at the time of continuously charging the battery and decreases the resistance at the time of actually using the battery.

5. The battery pack device according to claim 1, further comprising:

a first rectifying element that is connected in series with the current adjusting portion and conducts a current only in a charging direction of the battery; and a second rectifying element that is connected in parallel with the current adjusting portion and the first rectifying element and conducts a current only in a discharging direction of the battery.

6. The battery pack device according to claim 1, wherein the detecting portion detects the charging state based on a terminal voltage, a charging discharging current and a temperature of the battery.

7. The battery pack device according to claim 1, wherein the secondary battery is a nickel-metal hydride secondary battery.

* * * * *

UNITED STATES PATENT AND TRADEMARK OFFICE

CERTIFICATE OF CORRECTION

PATENT NO. : 6,955,859 B2
APPLICATION NO. : 10/153467
DATED : October 18, 2005
INVENTOR(S) : Kimura et al.

It is certified that error appears in the above-identified patent and that said Letters Patent is hereby corrected as shown below:

Title page,
Item [73], Assignees, insert -- Toyota Jidosha Kabushiki Kaisha, Aichi (JP) --.

Signed and Sealed this

Twenty-seventh Day of June, 2006

JON W. DUDAS
*Director of the United States Patent and Trademark Office*